June 12, 1962  A. B. ECKERT, JR  3,038,607
ARTICLE MARKING AND ORIENTING
Filed June 20, 1958  13 Sheets-Sheet 10

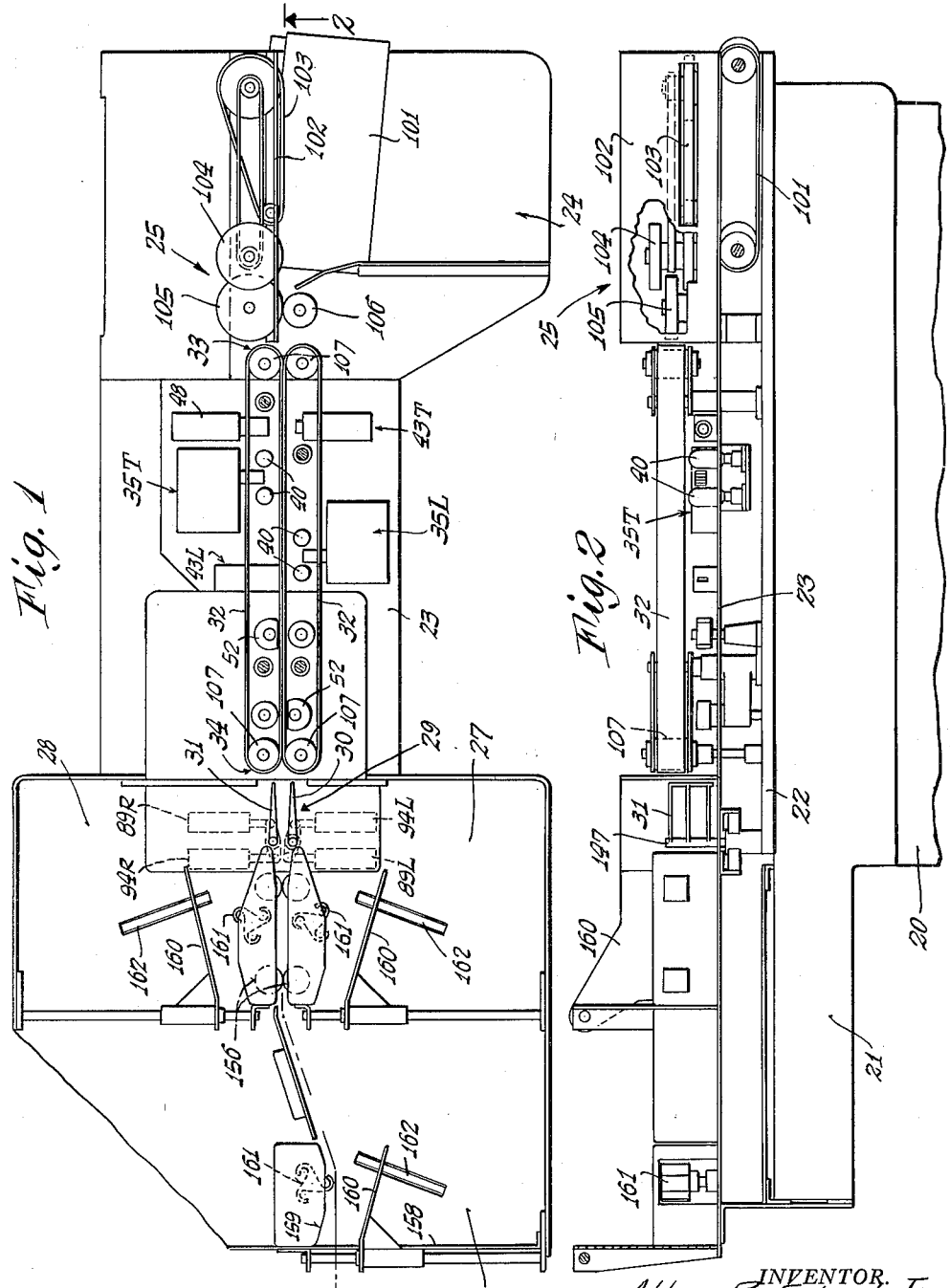

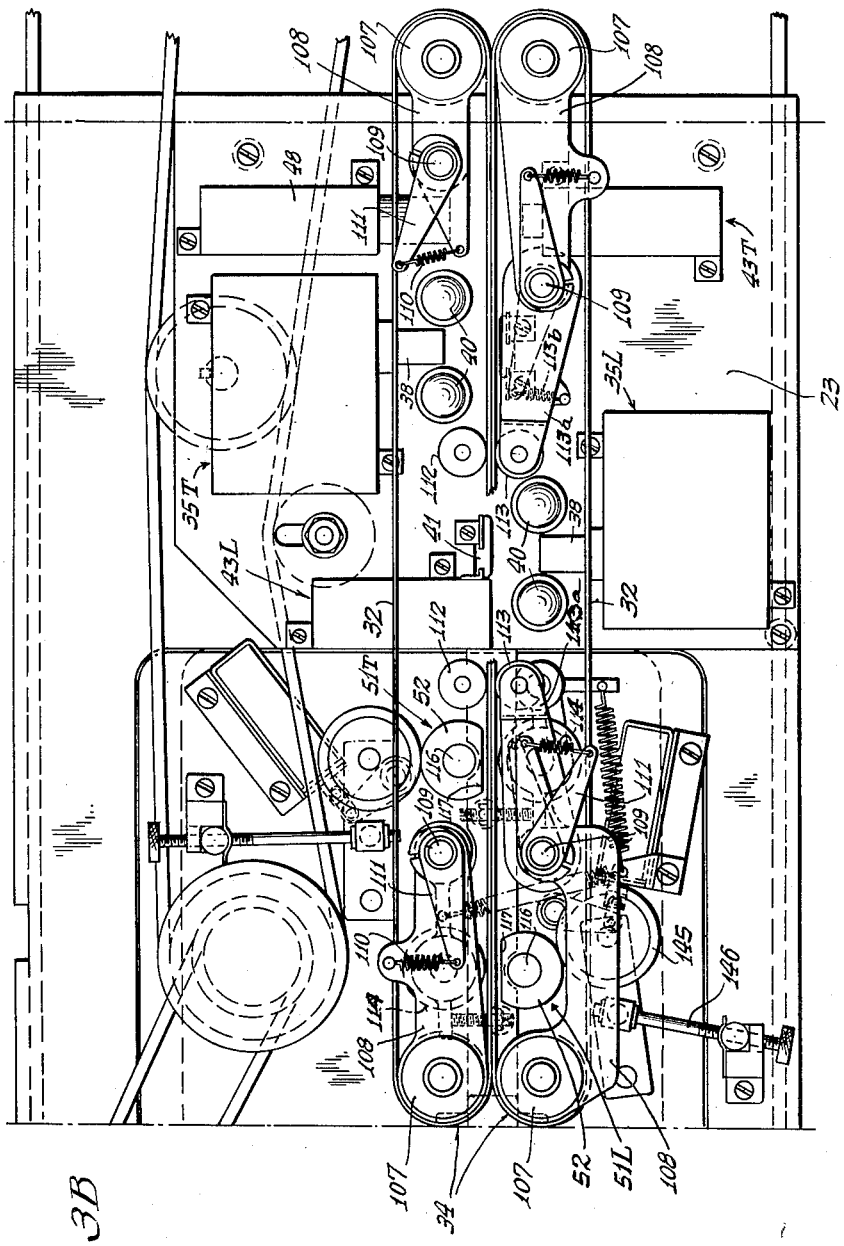

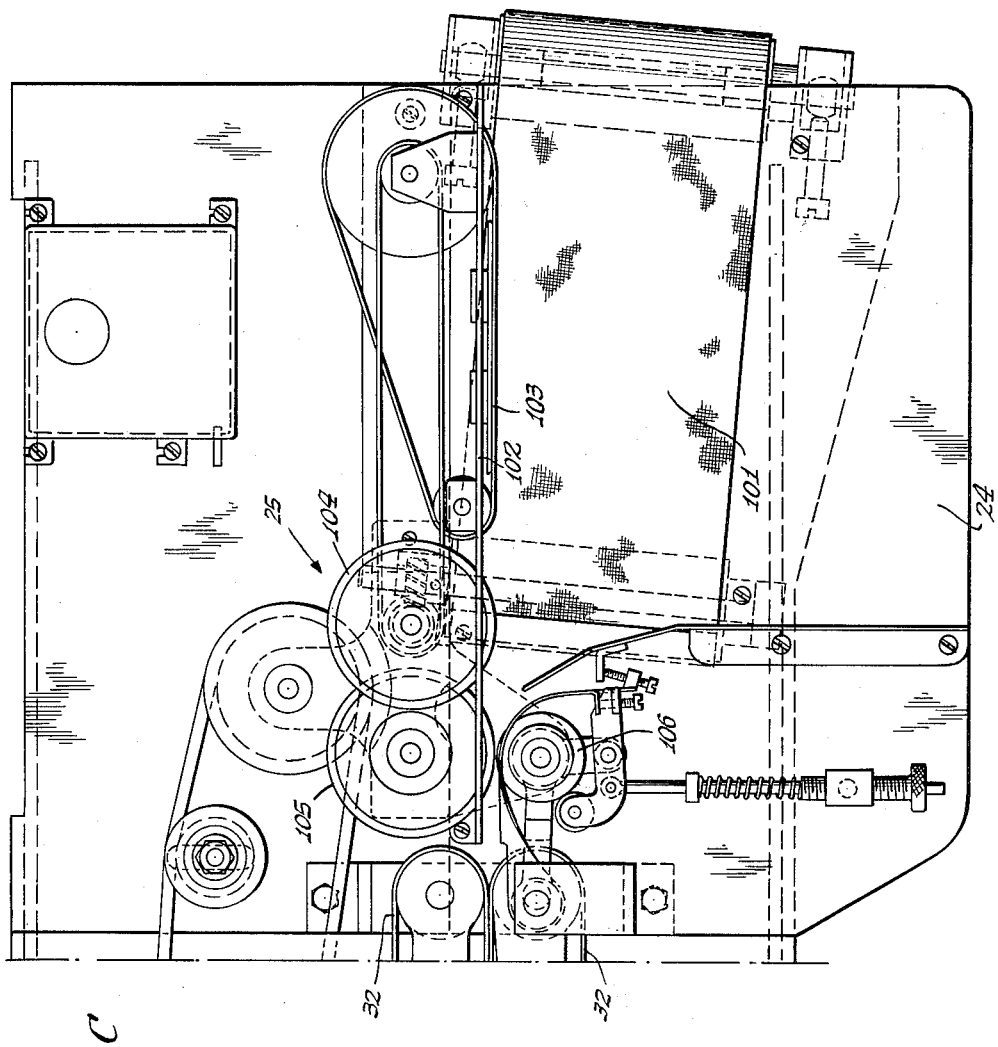

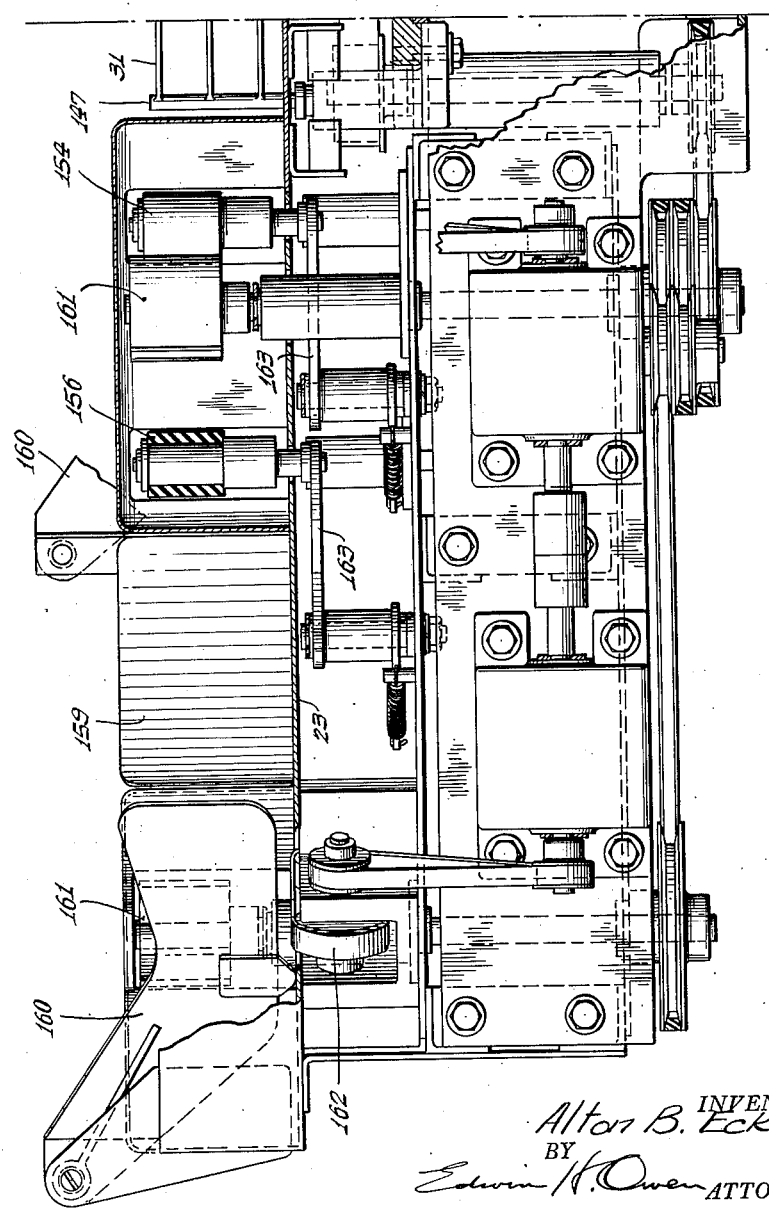

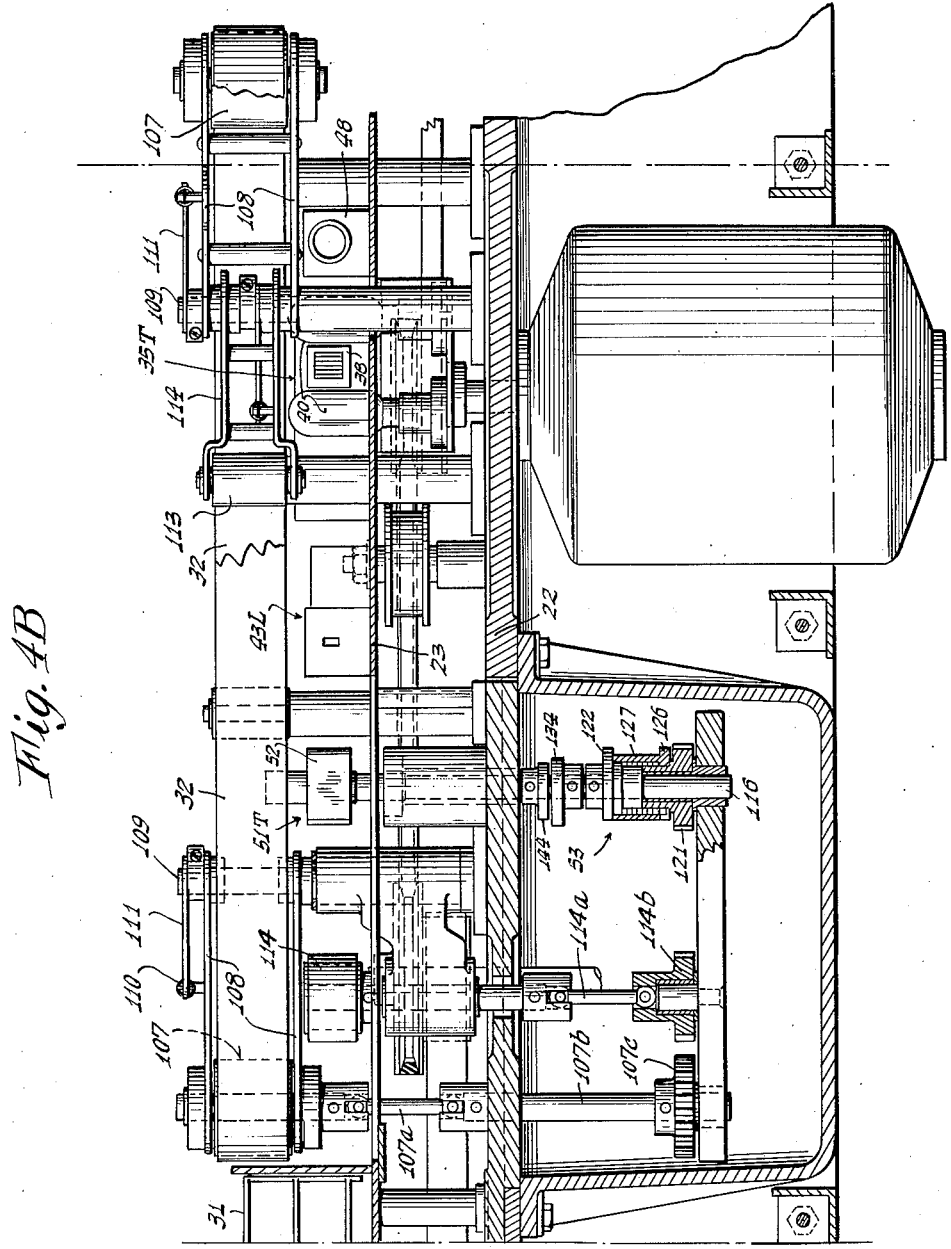

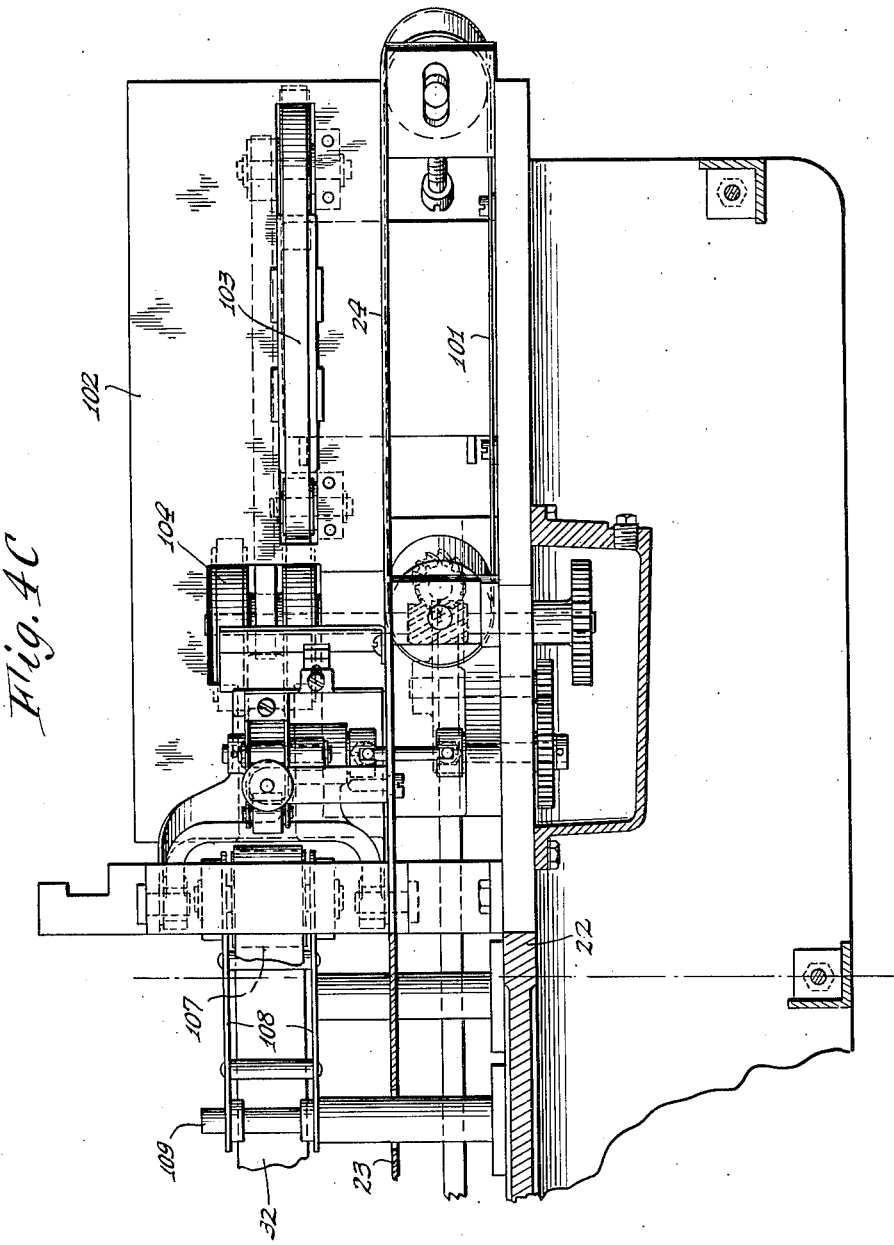

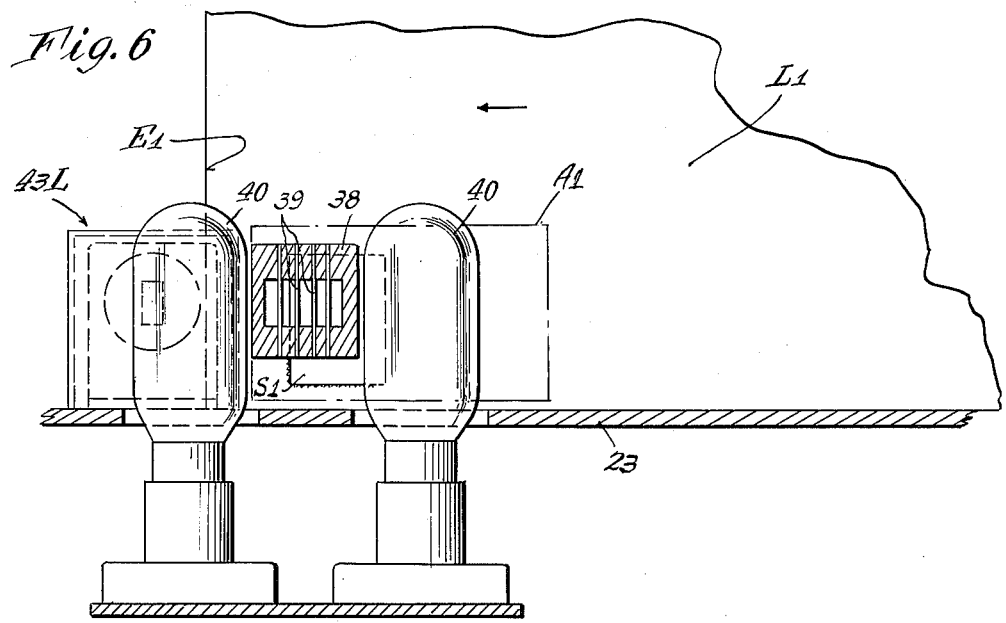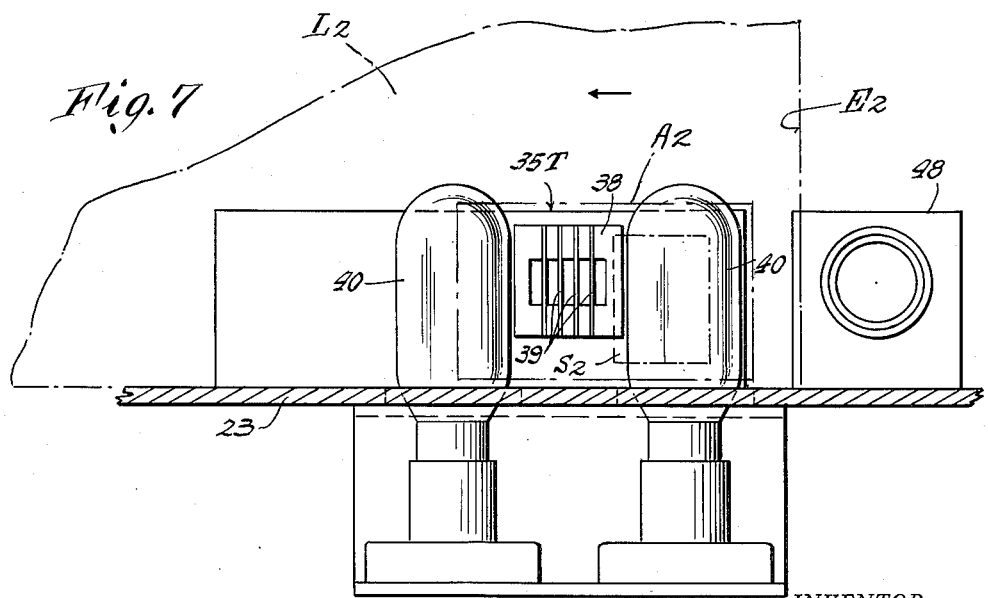

INVENTOR.
Alton B. Eckert, Jr.
BY
Edwin H. Owen
ATTORNEY

June 12, 1962  A. B. ECKERT, JR  3,038,607
ARTICLE MARKING AND ORIENTING
Filed June 20, 1958  13 Sheets-Sheet 11

INVENTOR,
Alton B. Eckert, Jr.
BY
Edwin H. Owen
ATTORNEY

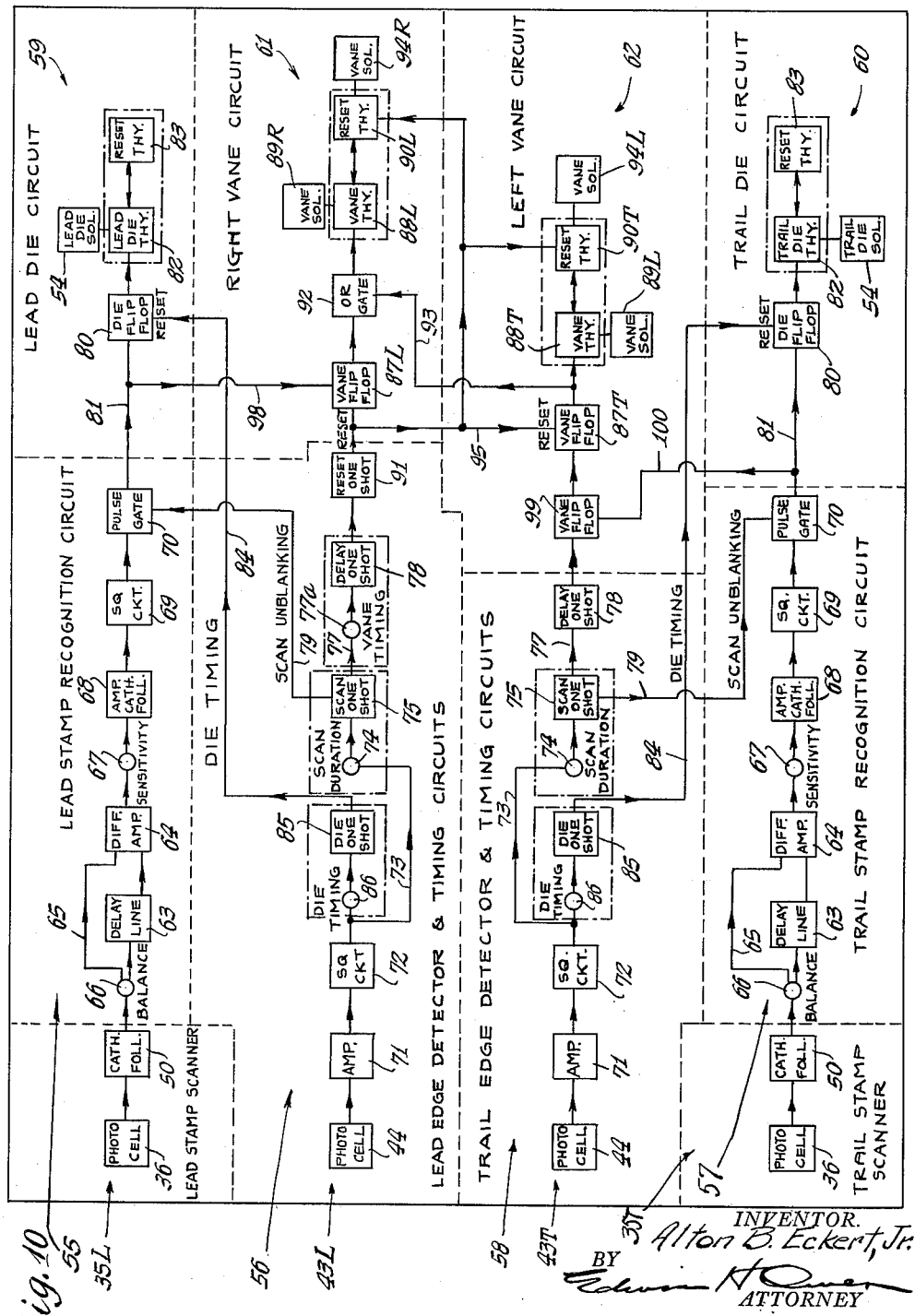

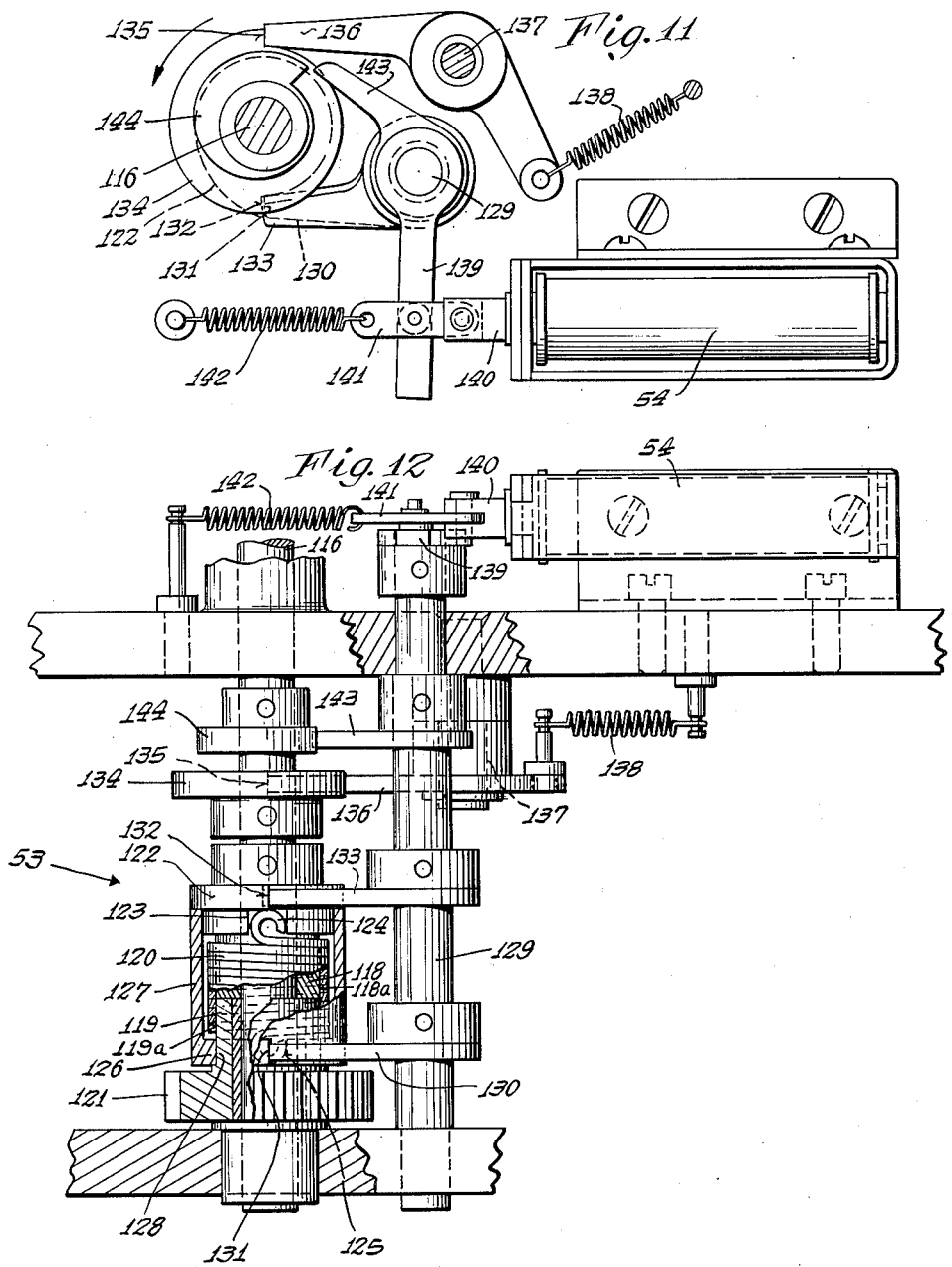

United States Patent Office 3,038,607
Patented June 12, 1962

3,038,607
ARTICLE MARKING AND ORIENTING
Alton B. Eckert, Jr., Port Chester, N.Y., assignor to Pitney-Bowes, Inc., Stamford, Conn., a corporation of Delaware
Filed June 20, 1958, Ser. No. 743,423
2 Claims. (Cl. 209—111.5)

This invention relates to article handling and treating and especially to the marking and/or segregating of a plurality of articles fed in succession past a predetermined place.

More specifically, the present invention relates to apparatus for handling randomly oriented letter mail to cancel the postage thereon and/or to sort the same into groups of cancelled and uncancelled letters, the cancelled letters being separated and collected into two separate stacks—one stack with the front of the letters facing in one direction and the other stack with the front of the letters facing in the other direction.

An object of the present invention is to improve such apparatus to make it more reliable in operation, easier to adjust and operate, and more economical to manufacture.

The apparatus to which the present invention is applied comprises a letter-receiving station having means of supporting on their long edges a stack of letters which are placed on the support as the letters are picked up in bunches and without regard to the way in which the letter faces or whether the stamped area is at their top edges or bottom edges in the stack. At the receiving station, feeding and separating means are provided for advancing the end letters of the stack one at a time. From the receiving and separating station the letters are fed riding on one long edge and in a vertical position past stamp scanning mechanism and stamp cancelling mechanism controlled thereby to cancel stamps located on the lower edges of the letters whether the stamped side of the letter is facing in one direction in which case the stamps will be at the leading edge of the letter, or in the other direction in which case the stamps will be located at the trailing edge of the letter.

After a letter passes the sensing and cancelling mechanism, it is fed into segregating and stacking mechanism which is operated in response to the sensing mechanism to place the letters with cancelled stamps at the leading edges in one stack, those with the cancelled stamps at the trailing edges in another stack, and those having no cancelled stamps at the lower edges in another stack.

The groups of letters from the first two stacks may then be brought together by hand so that all the letters will face in the same direction and may thus be passed on for further handling. The letters in the third stack, that is those not having cancelled stamps, may be inverted and run through the apparatus a second time with the top edges downward, and the letters having stamps on one side will be segregated from those having stamps on the other side. In the third stack it will then be found that the letters do not have any stamps or the stamps are in such positions as to require hand cancelling.

One of the features of the present invention is the provision of improved means for feeding the letters through the sensing and cancelling mechanism. For this purpose, the present invention provides a pair of flat cooperating belts extending in face-to-face contact along the path of the letters from the receiving means to the stacking means so that a letter passing between the belts will be carried forwardly in a vertical position. The belts are spaced from a table along which the letters slide on their lower edges so as not to cover any stamps which are located along the lower portions of the letters. By the use of belts rather than feed rollers or other feeding means, the letters are kept flat and vertical in their travel and are fed smoothly and continuously even though there may be substantial variation in the thickness of successive letters.

Another feature of the present invention is the provision of a single light sensing or photosensitive device, such as a photoelectric cell in the form of the invention herein illustrated, and the circuitry associated therewith for sensing both the stamp and the body of the letter on which the stamp is located so as to evaluate the reflectivity of the stamp and the body of each letter as it advances and to initiate operation of cancelling and segregating mechanism when a difference in reflectivity is sensed.

One such single sensing device is provided for each side of the letters, one operating to detect the presence of a stamp at the lower leading edge of the letter and the other one for detecting a stamp at the lower trailing edge of the letter.

The control apparatus for each of said stamp-sensing devices includes a delay line leading to a difference amplifier and another line leading directly to a second input of the same difference amplifier, and when a stamp has been sensed the signal produced by the difference amplifier ultimately results in operating the related stamp cancelling and the letter segregating mechanisms to cancel the stamp and select the stack in which the letter is to be deposited.

Since the stamp is sensed at one position in the travel of the letter while it is to be cancelled in an advanced position, the signal from the difference amplifier is stored for a predetermined time before it is made effective.

So that this will not be dependent upon the length of the letter, in order that letters of various lengths may be treated and for other reasons pointed out below, edge-detecting means are provided for each of the stamp-sensing devices, and each edge detector is located in a predetermined position relative to and spaced from its associated stamp-sensing device. Signal delay means provided by electronic components and activated by the edge detector, cause the stamp cancelling mechanism to operate at the instant the stamp reaches the cancelling position and at the same time causes the segregating mechanism to be set so that the letter will be directed into the proper stack.

It sometimes occurs that a letter contains so many stamps that the overall length of the stamp area would exceed the printing area of the cancelling device with the result that some stamps would be left uncancelled, and there may occasionally be printed matter or other material in the upper left-hand corner of a letter which in color contrasts with the body of the letter.

To avoid the possibility of not cancelling some of the stamps on a letter when they extend beyond the range of operation of the cancelling mechanism and to prevent a false stamp recognition signal being produced by the printed and other matter in the upper left-hand portions of letters which would initiate the operation of the cancelling and segregating mechanism, the letter scanning devices and their circuitry are so arranged as to be effective to accept a signal only if the stamps are within a predetermined zone of the upper portion of the letter extending inwardly from the upper right-hand corner.

The arrangement is such that if a stamp overlaps the inner boundary of said zone, no stamp recognition signal will be transmitted to the cancelling or segregating mechanism, but if the inner edge of the innermost stamp is located within the sensing zone the stamp recognition signal will be transmitted. Also, any matter or material contrasting in reflectivity which is located beyond the zone, even if sensed, will not result in a signal being transmitted to the cancelling and segregating mechanism.

This is accomplished by the present invention by timing means set into operation by the edge detector, and the arrangement is such that previous to and after the expiration of a predetermined time, during which the letter travels forwardly from a predetermined point, the stamp recognition signal will be blocked from passage to the cancelling and segregating mechanism.

When the stamp recognition signal is blocked and thus made ineffective, the letter sensed will pass through the cancelling mechanism without the stamp or stamps being cancelled and it will enter a separate stacking compartment.

The provision of a single photoelectric cell or the like, one for each side of the letters, which senses both the stamp and the body of a letter has advantages over the arrangement wherein one photocell senses the letter and another photocell senses the stamp because it avoids the necessity of having the two photocells balanced and maintained so to their characteristics and responses. With the single photocell and delay line arrangement, any long time variation in illumination, photocell sensitivity, color response, or amplifier characteristics affect both the direct and delayed signals equally and therefore cannot cause unbalance between them. This results in exceptionally good stability of the circuits.

Another feature of the present invention is the provision of improved means for segregating the letters into the three stacks, the one having cancelled stamps at their lower trailing edges, the other having cancelled stamps at their lower leading edges, and the other having no cancelled stamps on their lower edges. According to the present invention the segregating means is under the control of the stamp-sensing and edge detecting devices, and the control is such that there is a substantial reduction in the number of mechanical operations which must be performed by the segregating means.

In the form of the invention herein disclosed, the segregating means includes a pair of vanes along the path of travel of the letters as they leave the cancelling mechanism and these vanes are positioned so that one or the other may intersect the path of the letter and deflect the letter into one stack or another or the vanes may be positioned so as not to intersect the path of the letters to permit the letters to advance undeflected into a third stack.

According to the present invention, the arrangement is such that the vanes do not change their positions when several letters belonging in the same stack follow each other, but only when the following letter is to be directed to a different stack from the letter which preceded it. Thus the vanes need only move when a change in position is required. This is an advantage over arrangements where the vanes always return to one normal position after each letter passed through the segregating mechanism.

As stated above, the vanes are controlled concomitantly with the operation of the cancelling mechanism and it follows that unless other arrangements are made the vanes would only be shifted when an approaching letter had its stamp cancelled.

However, the present invention makes provision whereby if neither of the stamp cancelling mechanisms has been made effective, the vanes will move to the position causing the uncancelled letter to be directed to its proper stack. For this purpose, the electronic control of the segregating vanes is such that if an edge-responsive signal has been passed through the circuits the absence of a stamp recognition signal will result in the vanes being positioned to guide the letter to the stack for letters having no cancelled stamps. For every letter, stamped or unstamped, this edge-responsive signal reaches the final control for the segregating mechanism and electronically sets it to the "no stamp" condition. An instant later (measured in milliseconds) the stamp recognition signal will arrive and cause the segregating mechanism to move to the appropriate "stamp" condition. Hence the time is so short that the vanes do not have an opportunity to shift to "no-stamp" position by the time a signal reaches them for one of the two stamped-letter reflecting positions. This may or may not result in movement of the vanes from the position they previously occupied depending upon the requirements of the preceding letter. Of course, if no stamp recognition signal is received after the circuit is set to "no-stamp" segregating position, the vanes will move to that position unless they were previously in that position, in which case there will be no movement of the vanes.

In the drawings and in the following description the articles to be handled are referred to as "letters" for convenience and because the apparatus has great utility in the handling of letter mail, but it should be understood that this is only exemplary of the invention and that other articles carrying a designator for initiating a subsequent operation may be treated and sorted.

Other features and advantages will hereinafter appear.

For the purposes of illustration and explanation, the invention is shown in detail in its preferred form in the accompanying drawings, wherein:

FIG. 1 is a schematic plan view of the apparatus of the present invention;

FIG. 2 is a longitudinal section taken on the line 2—2 of FIG. 1;

Figure 3A:
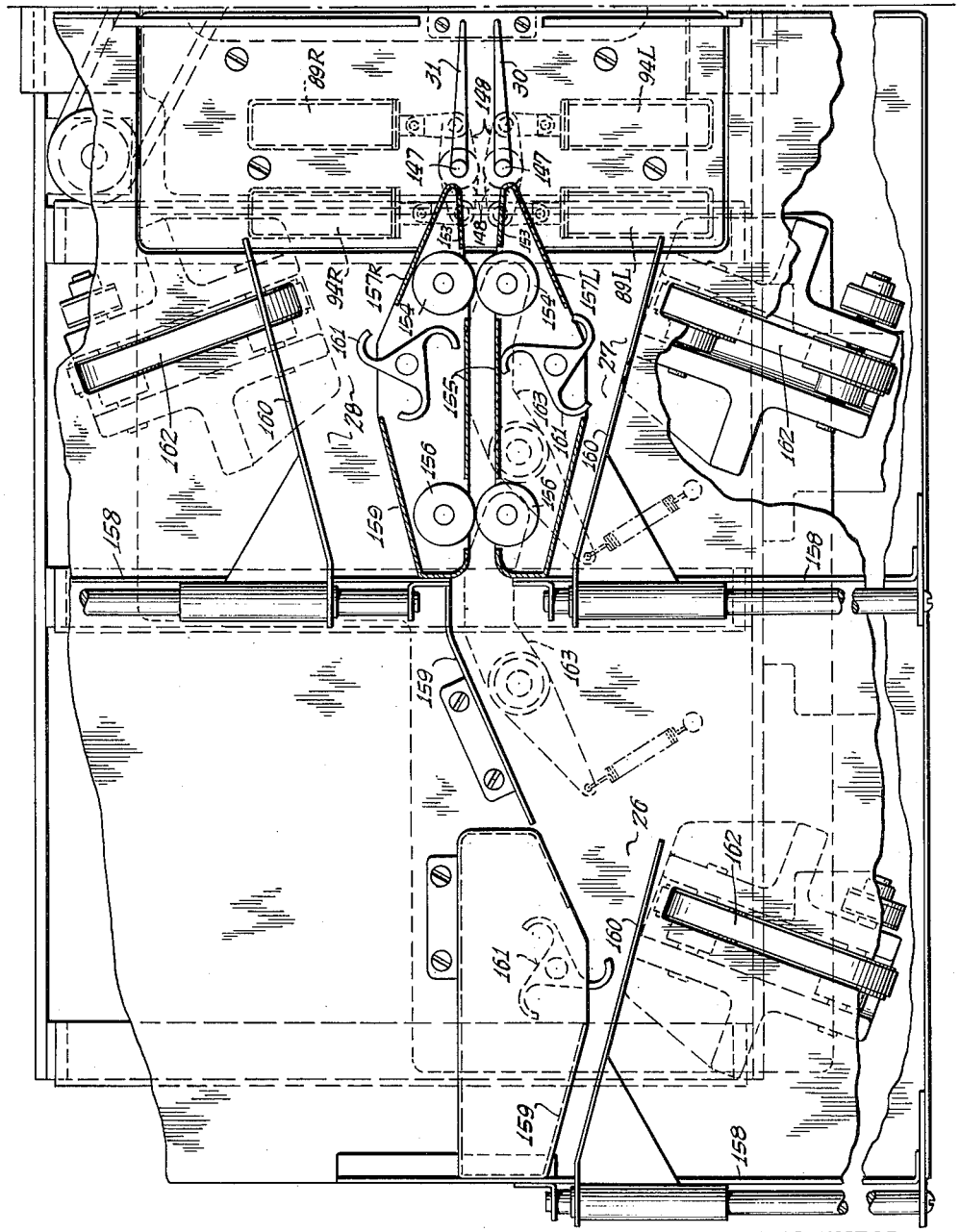
Figure 5:
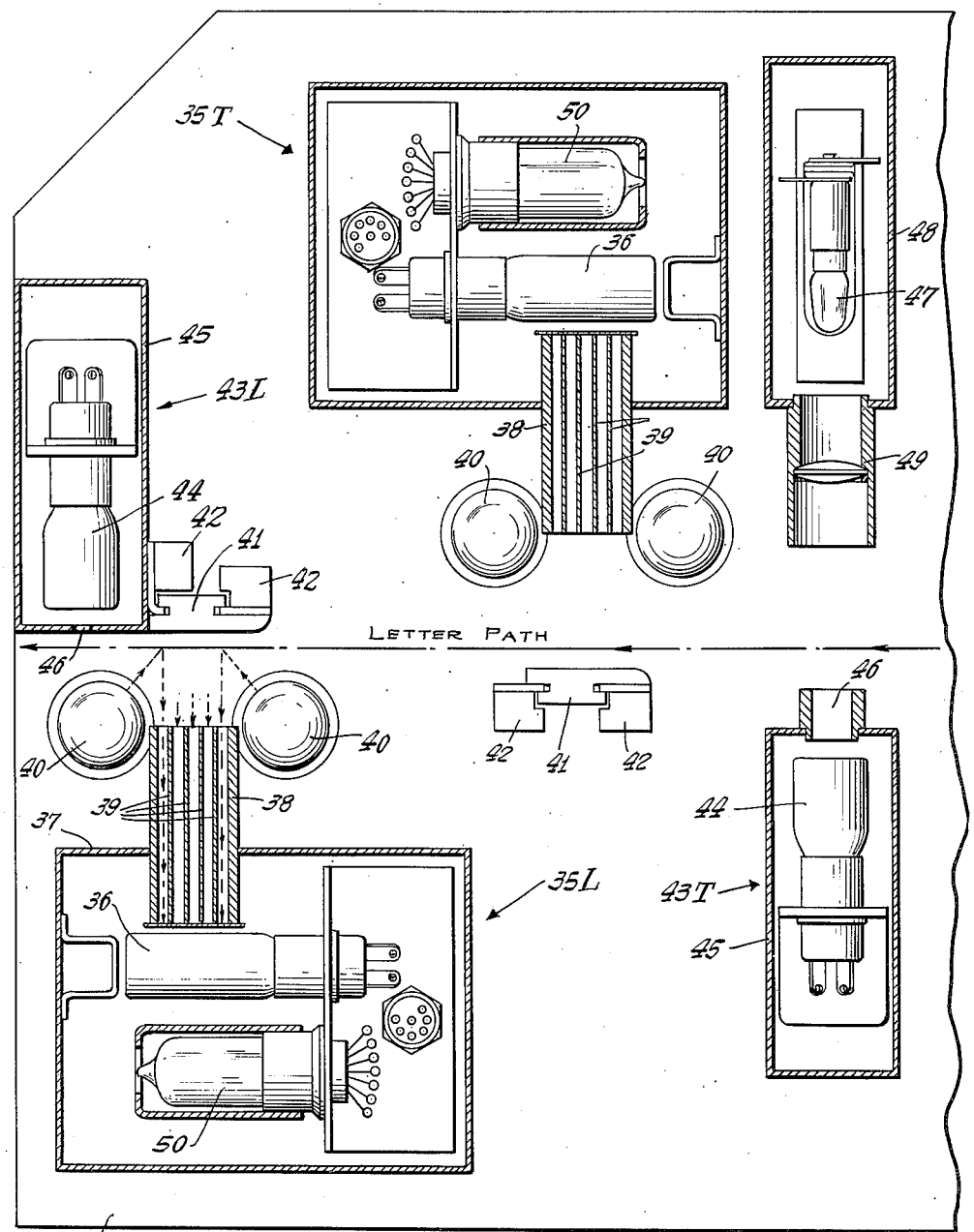
Figure 8:
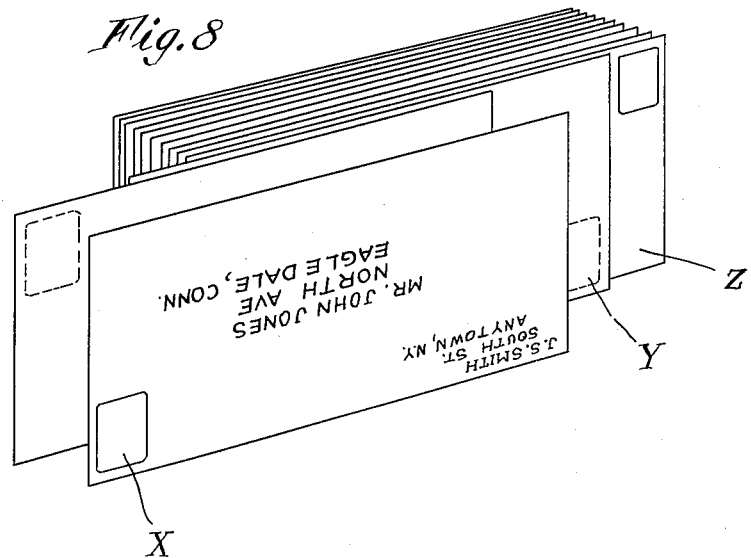
Figure 8A:
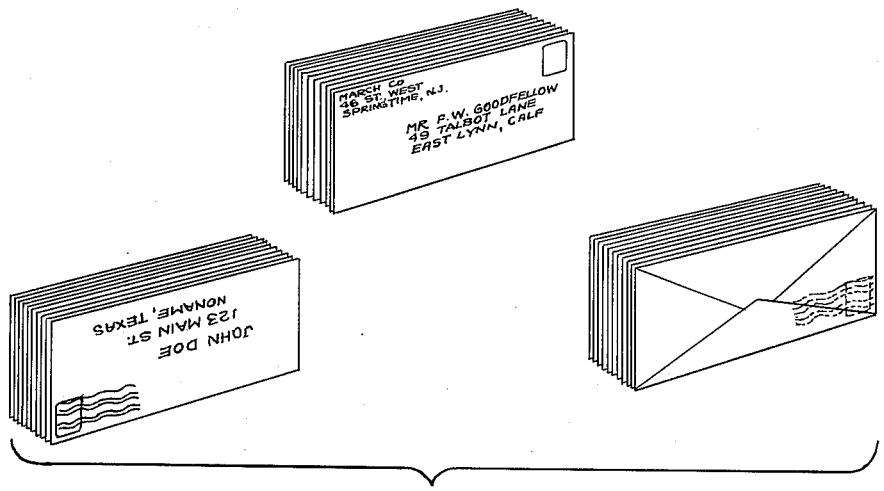
Figure 9:
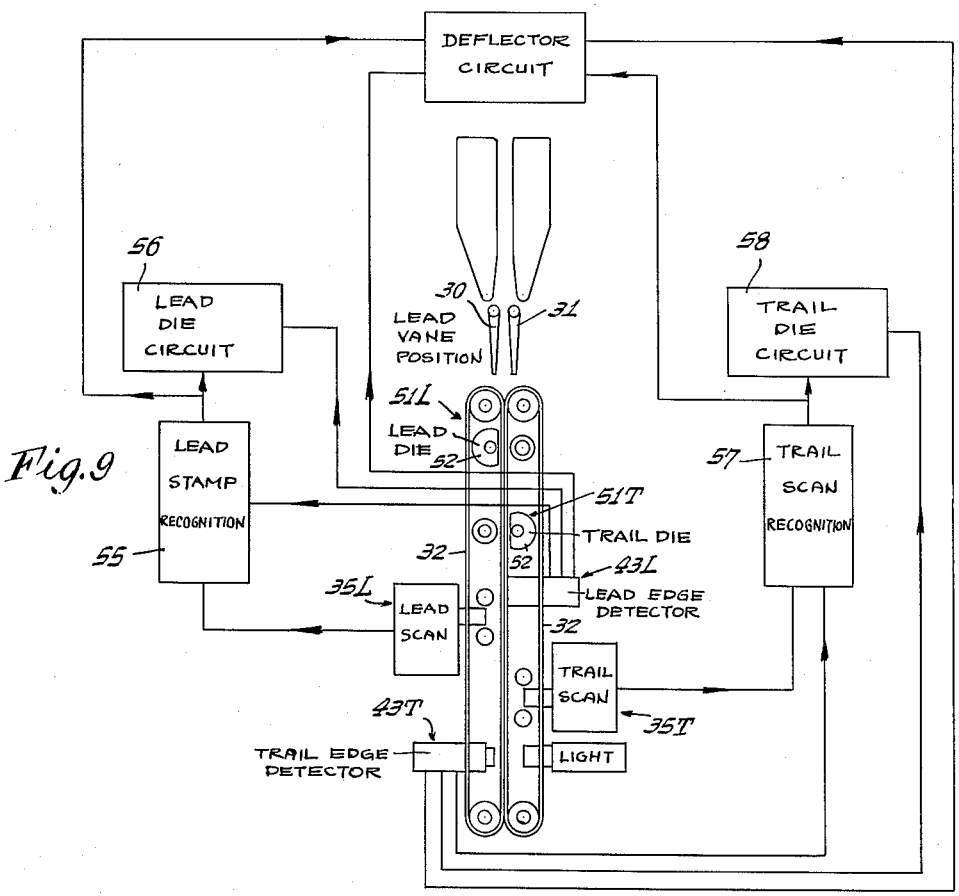
Figure 9A:
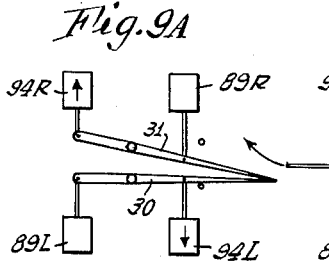
Figure 9B:
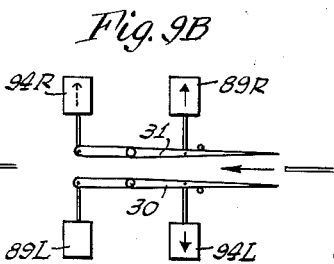
Figure 9C:
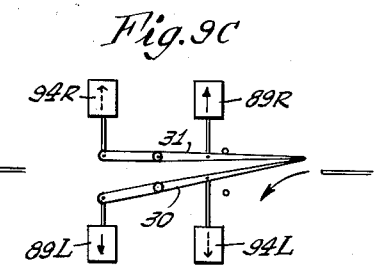

FIG. 3A, FIG. 3B and FIG. 3C are plan views of the apparatus of the present invention—FIG. 3A showing the segregating and stacking mechanism, FIG. 3B showing the sensing, feeding and cancelling mechanism, and FIG. 3C showing the letter receiving and separating mechanism—FIG. 3A, FIG. 3B and FIG. 3C when joined successively along the broken lines showing a complete top plan view of the apparatus with some of the overlying parts broken away to show parts beneath them;

FIG. 4A, FIG. 4B and FIG. 4C are vertical longitudinal sectional views corresponding to FIG. 3A, FIG. 3B and FIG. 3C respectively, and likewise when joined along the broken lines showing the full length of the apparatus;

FIG. 5 is a plan view on a larger scale of the edge detecting and stamp recognition mechanism;

FIG. 6 is a view on a larger scale of portions of the leading edge detector and the leading edge stamp sensing mechanism showing a fragment of a letter having a stamp at its leading edge in position to be sensed;

FIG. 7 is a view similar to FIG. 6, showing the edge detector and stamp sensing mechanism for letters having stamps at their lower trailing edges—a fragment of such letter being indicated by broken lines;

FIG. 8 shows a stack of letters with several of the letters laterally and longitudinally displaced to show several of the conditions that may be encountered when a stack of letters is placed in the machine at random without regard to the location of the stamps thereon;

FIG. 8A shows three stacks of letters—one having cancelled stamps at the lower leading edges, one having cancelled stamps at the lower trailing edges, and one having stamps uncancelled at their upper edges, the letters having been separated into three stacks by the operation of the apparatus of the present invention;

FIG. 9 is a schematic view of a part of the apparatus of the present invention showing the various circuits by simplified block diagrams;

FIG. 9A is a schematic view showing the segregating vanes in the positions which they occupy when a letter having no cancelled stamps at its lower edge reaches them and also showing the solenoids for operating the vanes;

FIG. 9B is a view similar to FIG. 9A, but showing the vanes in the positions they occupy when a letter having a cancelled stamp on its lower leading edge is approaching the vanes;

FIG. 9C is a view similar to FIG. 9A and FIG. 9B, showing the vanes in the positions they occupy when a letter having a cancelled stamp on its lower trailing edge approaches the vanes;

FIG. 10 is a block diagram showing in greater detail the various circuits for sensing the letters and stamps and for controlling the cancelling dies and the deflector vanes;

FIG. 11 is a plan view showing the mechanism for initiating and controlling the operation of the stamp cancelling dies; and FIG. 12 is a side view of the mechanism shown in FIG. 11 and illustrating in detail the one revolution clutch which when released causes the cancelling die driven by it to make a single revolution and be stopped automatically.

Referring to the drawings, particularly FIGS. 1 and 2, the present invention is shown embodied in a machine including a base 20 which houses the motor power and the electrical control equipment. The upper portion 21 of the machine has a supporting plate or deck 22 on which there is carried a worktable 23 which may be made in several sections extending in one plane from one end of the machine to the other.

At the right-hand end of the machine as viewed in FIGS. 1 and 2 there is provided a letter-receiving station 24 at which letters to be operated upon are deposited on a work-table 23 on edge in bunches without regard to the positions the postage stamps occupy on the several letters. At the letter-receiving station there is provided letter-separating and advancing mechanism 25 wherein the end letters only of a bunch are advanced toward the left one at a time in spaced relation.

At the left-hand side of the machine, as viewed in FIG. 1, there are provided stacking compartments 26, 27 and 28 and segregating mechanism 29 by which letters passing through the machine are caused to enter and be stacked in groups according to whether the cancelled stamps are located at the lower leading edge of the letter, the lower trailing edge of the letter or the letter has no cancelled stamp along its lower edge either at the leading or trailing edges.

The arrangement in the illustrated embodiment of the invention is such that any letters having cancelled stamps in the lower leading position, as indicated at X in FIG. 8, are directed into the stacking compartment 26, letters having cancelled stamps in the lower trailing position, as indicated at Y in FIG. 8, are directed into the stacking compartment 27, and letters having no cancelled stamps on their lower edges, as indicated at Z in FIG. 8, are directed into the stacking compartment 28.

The segregating mechanism 29 and the means for stacking the letters in the compartments 26, 27 and 28 will be described in detail below. Suffice it to say here that the segregating mechanism includes a pair of pivoted vanes 30 and 31 which are positioned so that one or the other of the vanes intersects the path of an advancing letter and deflects it into either the stacking compartment 26 or 27, or the vanes are parallel being positioned as shown in FIG. 1 so as not to intersect the path of the letter, in which case the letter will be deposited in the stacking compartment 26. The vanes 30 and 31, as will appear below, are under the joint control of means for sensing the body of the letter and the stamp, if the latter is present, and also means for sensing the passage of the edge of the letter adjacent to a stamp which has been or will be detected.

Between the letter-receiving station 24 and the letter-stacking compartments 26, 27 and 28 the letters are advanced one by one as delivered by the separating and feeding mechanism 25 by a pair of power driven flat feeding belts 32 which are yieldingly held in face-to-face engagement and between which the letters are carried forward in vertical position with their longitudinal lower edges riding on the worktable 23. The feeding belts 32 have their receiving ends 33 located in line with the separating and advancing means 25 and their delivery ends 34 located in line with the left and right segregating vanes 30 and 31 respectively, and it is between the ends of the feeding belts 32 that the sensing means and the stamp cancelling means are located.

Since it cannot be predicted on which side of a letter the stamp will be located, there are two sensing mechanisms and two stamp cancelling mechanisms, one on each side of the path of the letters as determined by the engaging faces of the feeding belts 32. Letters on which the stamps are located at the leading edges will have the stamps facing to the left as viewed from the letter receiving end of the machine and on those letters having the stamps adjacent the trailing edges the stamps will be on the right-hand side of the letters. Since the left and right side scanning and cancelling mechanism are essentially alike the reference numerals applied to the parts will be distinguished by the suffixes L and T to indicate leading and trailing stamp positions.

As stated above, according to the present invention there is, in the form of the invention illustrated herein, but one stamp detecting device for each side of the letter. As shown, these are in the form of photoelectric detecting devices 35L and 35T and these are mounted in fixed position so as to be directed at the lower edge portions of advancing letters in the space between the lower edges of the belts 32 and the surface of the worktable 23.

Referring to FIG. 5 which shows in detail the stamp detecting devices, each consists of photoelectric tube 36 mounted in a lightproof casing 37 supported on the worktable 23. The casing 37 has a light conducting tube 38 provided with parallel baffles 39 directed toward a predetermined place in the path of travel of the letters so that only substantially parallel light beams may be reflected back to and impinge upon the photoelectric tube 36. Light is supplied by a pair of lamps 40, one at each side of the light tube 38, and positioned to illuminate the letters and the stamp if present as a letter advances past the predetermined sensing point.

Directly opposite the light tube 38 on the other side of the letter path there is a target body 41 having a reflecting surface simulating the letter surface so that in the absence of a letter in the optical path of the light tube, light reflected back to the photoelectric tube 36 will be substantially that of the letter. The reason for this to prevent sudden changes of reflection from letter to non-letter conditions. The target member 41 is removably mounted in brackets 42 for replacement and reconditioning of its surface when required.

The unitary scanning devices 35L and 35T optically scan and electrically respond to the body of the letter and to the stamp if present, and as will be more fully explained below signifies the presence of a stamp by a comparison of the reflecting of the stamp and the adjacent surface of the letter, but the signal based on the difference in reflectivity is not effective alone to control the cancelling or segregating mechanism, but depends on the time that the leading edge in the case of the sensing device 35L passes a predetermined point or the trailing edge in the case of the sensing device 35T of the letter passes a different predetermined point.

For the purpose of sensing the passage of the leading edge of the letter, the present invention provides a sensing device 43L for the leading edge of the letter and a sensing device 43T for the trailing edge of the letter. These sensing devices are located at the side of the path of the letters opposite to that at which their corresponding stamp detecting devices are located. Each includes a photoelectric cell 44 mounted in a lightproof casing 45 and having a light passage 46 directed toward the path of the letter and facing illuminating means located at the opposite side of the letter path so that the presence or absence of the body of the letter between it and its light source will produce different signals, and the arrangement is such that the change of signals indicates that the edge of a letter has passed a predetermined point.

The light source for the edge detector 43L is provided by one of the lamps 40 for the stamp scanning device 35L since it may be located closely adjacent the latter. In the case of the edge-detecting device 43T, a separate source of illumination in the form of a lamp 47, enclosed in a casing 48, is provided. The casing 48 has a lens carrying a light tube 49 directed toward the aperture of the scanning device 43T so that the passage of light from the lamp 47 to the photocell 44 may be interrupted by the travel of a letter in the letter path.

It may be mentioned at this point that the scanning devices 35L and 35T may each include a cathode follower circuit, of which tube 50 is a part. This forms part of the control circuits as explained below.

Between the letter and stamp scanning devices 35L and 35T and the delivery ends of the belts 32 (FIG. 3B), there are provided stamp cancelling mechanisms 51L and 51T each of which has printing devices and includes printing dies 52—52. The die 52 of the cancelling mechanism 51L is located at the left side of the letter path to cancel stamps on the leading lower edge of letters, while the die for the cancelling mechanism 51T is located at the right side of the letter path to cancel stamps at the trailing lower edge of the letters. The dies 52—52 are normally positioned out of the letter path and are made operative respectively by signals originating in the stamp scanning and edge-detecting devices.

The cancelling mechanism will be more fully described below, but it may be pointed out here that along the path of the letters the dies 52 are spaced from their respective stamp sensing devices 35L and 35T and that the dies 52 are operated by one revolution clutches 53, see FIGS. 11 and 12. Said clutches are controlled by solenoids 54 at the proper time, that is to say, at the time a stamp or stamps on a letter about to pass the operating point of the cancelling die 52.

FIGS. 6 and 7 show the relative positions of the stamp and letter scanning devices and the edge detectors for letters having stamps at the leading and trailing edges respectively. In FIG. 6 the letter L1 with its stamp S1 is shown in position in which the leading edge E1 has not yet reached the edge detector 43L while the stamp S1 has not passed by the light conducting tube 38 of the stamp scanner 35L. In FIG. 7, the letter L2 with its stamp S2 at the trailing edge E2 has passed the trail edge detector 43T while the stamp S2 is about to reach the light conducting tube 38 of the stamp scanner 35T. The dot-and-dash lines indicate the areas A1 and A2 within which stamp recognition signals are accepted.

The means for transmitting and controlling the signals from the stamp-sensing devices and the edge detecting devices are diagrammatically illustrated in FIGS. 9 and 10 by way of example.

From the block diagram, FIG. 10, it will be seen that there are eight main circuit arrangements, to wit—a lead stamp recognition circuit 55, which includes the scanner 35L; a leading edge detector and timing circuit 56, which includes the lead edge detector 43L; a trail stamp recognition circuit 57, which includes the scanner 35T; a trail edge detector and timing circuit 58, which includes the trail edge detector 43T; a lead die circuit 59, which includes the solenoid 54 for the lead cancelling die; a trail die circuit 60, which includes the solenoid 54 for the trail cancelling die; a right vane circuit 61; and a left vane circuit 62.

The lead stamp recognition circuit 55 and the trail stamp recognition circuit 57 are essentially alike. Each includes, besides the photocell 36 and cathode follower 50, which amplifies the current from the photocell, a delay line 63 leading to a difference amplifier circuit 64 and a direct line 65 also leading to the difference amplifier circuit 64. A potentiometer 66 is interposed between the cathode follower 50 and the direct line 65 and the delay line 63 to balance the voltage of the signals transmitted to the difference amplifier. From the latter, a signal may pass to a potentiometer 67, which controls the sensitivity of the circuit, and then to an amplifier and cathode follower circuit 68 and then to a squaring circuit 69 which operates as an amplitude discriminator. The latter is connected to a pulse gate 70 by which the signal may be blocked or transmitted.

The stamp recognition signal which reaches the pulse gate 70, and is effective to control the circuits beyond the pulse gate, is created and transmitted by the difference amplifier 64. This difference amplifier receives signals from the photocell and cathode follower, generated at different times by the stamp and the body of the letter, which signals arrive at the difference amplifier simultaneously by reason of the direct and delay lines. It is to be noted that it is the inner edge of the stamp (or of the last stamp in a row of stamps) and the adjacent body of the letter which produces the two different signals thereafter being converted to a single signal by the difference amplifier which signal passes from the squaring circuit to the pulse gate and to the rest of the circuit. It will be clear, therefore, that if there is a row of stamps or other printed areas extending beyond the areas A1 or A2 of the letters, no difference signal will be produced during the time the pulse gate is unblanked and therefore no stamp recognition signal is produced. In FIG. 6 the left edge of the scan zone is determined by the physical location of the edge detector 43L and the stamp scanner 35L, since scan unblanking is initiated by the former. The right edge of the scan area A1 is determined by the scan duration. By means of this established scan area, extraneous markings on the envelope such as air mail borders, advertising and the like do not interfere with the operation of the device.

The lead edge and trail edge detectors and timing circuits 56 and 58 are also essentially the same, and each includes, in addition to the photocell 44, an amplifier 71, a squaring circuit 72 connected by a line 73 to means for determining the duration of the stamp scanning period, which means includes an adjustable potentiometer 74, and a one-shot multivibrator 75. The scan duration circuit is connected by the scan unblanking lead 79 to the pulse gate 70.

To avoid giving a false stamp recognition signal therefore, as a result of printed matter or other material along the normal upper right-hand edges of a letter and to avoid cancelling stamps which extend abnormally far inwardly of the edge of the letter which would not be cancelled by the cancelling die because of insufficient printing area thereon, the duration of the scanning operation for the lead stamps and the trail stamps is controlled by the scan duration circuits 74—75, and these circuits control their pulse gates 70 in such a way that a stamp recognition signal arriving before or after the expiration of the predetermined time will not be transmitted to the respective die and vane circuits.

Since the cancelling dies in the form of the invention shown herein are not designed to cancel more than three ordinary stamps in a row, the scan duration circuits 74—75 are adjusted so that if the stamps occupy a greater area than the areas A1 and A2 of the letters as indicated by the dot-and-dash lines in FIGS. 6 and 7, the stamp recognition signal will be blocked and the letter will be directed to the reject or no-stamp compartment 28, the same as though no stamp were recognized in said zones A1 or A2.

In the lead edge detector, another lead 77 from the scan duration control means 74—75 is connected to a vane timing circuit including an adjustable potentiometer 77a and a one-shot multivibrator 78 which is connected to the reset one shot 91 and hence to the vane circuit 61. By adjusting the potentiometer 77a of this vane timing circuit, the timing of the operation of the vanes may be varied. In the trail edge detector and timing circuit, the potentiometer 77a and reset one shot 91 is omitted.

The lead and trail die circuits 59 and 60 are essentially the same, and each comprises a flip flop 80 connected by a lead 81 to the pulse gate 70 of its related stamp recognition circuit to receive signals passed from the latter. The die flip flop 80 is connected by a lead 84 to the die timing circuit 85—86 and when receiving a signal therefrom (having previously been set by a stamp recognition signal through lead 81), it fires a thyratron one shot multivibrator circuit including a thyratron 82 and a reset thyratron 83. The solenoids 54 for initiating the operation of the stamp cancelling mechanism are energized by the thyratron one shot multivibrator circuit 82—83.

Thus, a properly timed stamp recognition signal passes through its related pulse gate 70, to the die flip flop 80 where it is stored or set. After the expiration of a predetermined time (required for the stamped area of the letter to reach the cancelling die) as controlled by the die timing circuit 85—86 the die timing signal will reset the die flip flop 80 and fire the thyratron one shot multivibrator 82—83 and cause its related cancelling die solenoid 54 to function.

The right vane circuit and the left vane circuit are somewhat similar and are interconnected in such a way as to mutually cooperate to produce the proper setting of the left and right segregating vanes 30 and 31 under conditions hereinafter explained.

The right vane circuit 61 controls the operation of the right segregating vane 31 by means of solenoids 84R and 89R which in turn are energized by the thyratron flip flop pair 88L—90L. The operation of this thyratron flip flop is controlled by signals from the vane flip flop 87L through "or" gate 92, and from the reset one shot 91 via lead 95. The exact operation will be described later.

The left vane circuit is similar except for the addition of a vane flip flop 99.

Between the vane flip flop 87T and the thyratron flip flop 88T—90T, there is a lead 93 connected to the "or" gate 92 which may also fire the right vane thyratron flip flop 88L—90L.

The segregator vanes may assume one of the three positions shown in FIGS. 9A, 9B, 9C depending on the location of the stamp on the letter. If no stamp is sensed, no stamp recognition signal will be generated and the die flip flops 80 and the vane flip flops 99, 87T and 87L will remain in their reset or normal condition. As the lead edge of the letter approaches the segregating vanes 30 and 31, a timing pulse will be generated, by the reset generator 91, which is directed to the thyratrons 90L and 90T of the 2 vane thyratron flip flops 88L, 90L and 88T, 90T. The lead edge of this pulse will energize thyratrons 90L and 90T and by flip flop action de-energize thyratrons 88L and 88T if they were energized. The trail edge of this same pulse, which occurs approximately five tenths milliseconds later, will reset the vane flip flops 87L and 87T, but since these have not been set by a stamp recognition signal, no output will be produced.

When final equilibrium is reached, thyratrons 90L and 90T will be fired thereby energizing solenoids 94R and 94L. Thyratrons 88L and 88T and their associated solenoids 89R and 89L will be de-energized. The segregating vanes 30 and 31 will therefore assume the position shown in FIG. 9A which will direct the letter into the no-stamp stacker 28. Note that if the next letter also has no stamp, no motion of the vanes 30, 31 will take place between letters.

If a lead stamp is sensed, a lead stamp recognition signal will be generated and the lead die flip flop 80 and the right vane flip flop 87L will be set while the trail die flip flop 80 and the left vane flip flops 99 and 87T will remain in the reset or normal condition. As the lead edge of the letter approaches the segregating vanes 30 and 31, a timing pulse will be generated, by the reset generator 91, which is directed to the thyratrons 90L and 90T of the two vane thyratron flip flops 88L, 90L and 88T, 90T.

The lead edge of this pulse will energize these thyratrons and by flip flop action de-energize thyratrons 88L and 88T if they were energized. The trail edge of this same pulse, which occurs approximately five tenths millisecond later, will reset the vane flip flops 87T and 87L. Since only flip flop 87L had been previously set, this unit alone will produce an output signal. This output signal is coupled through the "or" gate 92 to vane thyratron 88L thereby energizing it. Thyratron 90L is reset or extinguished by the ensuing flip flop action. When final equilibrium is reached, thyratrons 88L and 90T will be fired thereby energizing solenoids 89R and 94L. Thyratrons 90L and 88T and their associated solenoids 94R and 89L will be de-energized. The segregating vanes 30 and 31 will therefore assume the position shown in FIG. 9B, which will direct the letter into the lead stamp stacker 26. Note that if the next letter also has a lead stamp, no motion of the vanes 30, 31 will take place between letters since the circuits will be in the electrical condition shown in FIG. 9A for only five tenths milliseconds which is too short to allow the solenoids and their associated segregating vanes to physically move.

If a trail stamp is sensed, a trail stamp recognition signal will be generated, and the trail die flip flop 80 and the left vane flip flop 99 will be set. The lead die flip flop 80 and the right vane flip flop 87L as well as the left vane flip flop 87T will remain in the reset or normal condition. At the end of the trail scan duration, determined by the scan one-shot 75 and its control 74, the delay one-shot 78 is energized. At the end of a short delay the flip flop 99 is reset, producing a pulse which sets the vane flip flop 87T. As the lead edge of the letter approaches the segregating vanes 30 and 31, a timing pulse will be generated by the reset generator 91, which is directed to thyratrons 90L and 90T of the two vane thyratron flip flops 88L, 90L and 88T, 90T. The lead edge of this pulse will energize these thyratrons and by flip flop action de-energize thyratrons 88L and 88T if they were energized.

The trail edge of this same pulse, which occurs approximately five tenths millisecond later, will reset the vane flip flops 87T and 87L but, since 87T was the only one set by a trail stamp recognition signal, it alone will produce an output pulse and will fire vane thyratron 88T, and 88L through the lead 93 and the "or" gate 92. Reset thyratrons 90L and 90T will be de-energized by the resulting flip flop action. When final equilibrium is reached, thyratrons 88L and 88T will be fired thereby energizing solenoids 89R and 89L. Thyratrons 90L and 90T and their associated solenoids 94R and 94L will be de-energized. The segregating vanes 30 and 31 will thereby assume the position shown in FIG. 9C which will direct the letter to the trail stamp stacker 27. Note that if the next letter also has a trail stamp, no motion of the vanes 30, 31 will take place between letters since the circuits are in the electrical condition shown in FIG. 9A for five tenths millisecond which is insufficient for the solenoids and their associated segregating vanes to move.

It should be clearly understood that the signals received by the thyratron flip flops 88L—90L and 88T—90T from the edge detectors merely energize the solenoids 94R and 94L, and that if no stamp recognition signal is received the solenoids would operate to move the vanes to the position shown in FIG. 9A, unless the vanes were already in that position. It should also be understood that although the solenoids are energized as shown in FIG. 9A, each letter will cause a stamp detector signal to reach the thyratron flip flops before they have an opportunity to move their vanes. The vanes will not be moved from the position previously occupied unless the approaching letter is to be directed to a different segregating compartment from the one immediately preceding it, thus substantially reducing the wear and tear on the vanes and the vane-moving mechanism. Experience has shown that the movements of the vanes are reduced approximately 66% by this provision.

*Letter Receiving and Separating Means*

Referring to FIGS. 1 and 2, FIG. 3C and FIG. 4C, the letter-receiving station 24, in addition to having the table 23 on which the letters are placed on edge in bunches, comprises a power driven belt 101, the upper surface of which is substantially flush with the table 23, which urges the letters toward a stop plate 102 which is substantially in line with the path of travel of the letters through the machine. Projecting through the stop plate 102 is a feed belt 103 which constantly urges the end letter forwardly toward a pair of continuously rotating frictional surfaced rollers 104 having a high coefficient of friction. The rollers 104, engaging the foremost letter, advance it to the separating device which includes a continuously driven frictional surfaced feed wheel 105 and a reversely driven separator wheel 106, the latter being capable of preventing the feed of a second letter until the foremost letter has passed beyond the bite of the wheel 105. The separating and advancing means operates in a known manner of advance along a predetermined path one letter at a time, the trailing edge of one letter being spaced from the leading edge of the next letter.

Letter Feeding Means

As the leading edge of a letter advances beyond the separator wheels 105 and 106 it enters between the contacting faces of the belts 32. As shown in FIG. 3B, FIG. 4B and FIG. 4C, the belts travel over pulleys 107 mounted in frames 108 pivotally mounted on rods 109 carried by the deck 22. The frames 108 carrying the pulleys 107 for one belt are spring-urged toward those carrying the pulleys 107 for the other belt by springs 110, the fixed end of each of which is carried by an arm 111 rigid with the posts 109 (FIG. 3B) thereby causing the belts to be resiliently urged against each other so as to be capable of yielding to permit letters, including thick ones, to pass between the belts and cause them to be advanced.

Supplementing the spring-pressed pulleys to hold the belts together are rollers 112 and 113 and these are located along the path of the belts between the pulleys at the receiving and delivery ends of the belts. The rollers 113 are carried on arms 113a and are urged by springs 113b toward the rollers 112 which may be mounted on fixed axles. Each of the belt pulleys 107 on the discharge end is power driven through a universal joint 107a connected to a shaft 107b driven by a gear 107c. The gear 107c is power driven by any suitable mechanism.

Cancelling Mechanism

It will be appreciated, of course, that the stamp cancelling mechanism may be of any suitable kind and that the mechanisms illustrated in FIG. 3B and FIG. 4B are shown by way of example.

The cancelling mechanisms, 51L for cancelling stamps at the leading edges of the letters and 51T for cancelling the stamps at the trailing edges of the letters, are essentially the same. Each includes a die 52 mounted on a shaft 116 and each has a flat face 117 which, in its normal position as shown in FIG. 3B, is clear of the path of the letters. When a stamp is to be cancelled, a signal from the network above described is received by the solenoid 54—see FIG. 11 and FIG. 12, and this causes the operation of a single revolution clutch 53. Impression rollers 114—114 cooperate with the cancelling dies 52—52 and each impression roller is driven by a universal joint connection 114a to driven gear 114b.

The clutch mechanism comprises a sleeve 118 secured to the shaft 116, a hub end 119 of a gear 121 mounted for free rotation on the shaft 116, and a coupling coil spring 120 surrounding the peripheral surfaces 118a and 119a of the sleeve 118 and hub 119 respectively. The coils of the spring are tensioned to normally wrap around and grip said sleeve and hub to cause them to rotate together. The gear 121 is power driven and provides the drive through the spring 120 to the shaft 116 and die 52 to rotate the printing face thereof against the stamp as the letter passes the printing point. The sleeve 118 has at its upper end, as viewed in FIG. 12, a flange 122 having a notch 123 in which the looped end 124 of the spring 120 is anchored. The other looped end 125 of the spring is anchored in a notch in the internal end flange 126 of a casing 127 which encloses the spring 120 and limits its expansion movement. The flange 126 is mounted on a portion 128 of the hub 119 for free rotation thereon.

To unwrap the coil spring 120 and thus disconnect the sleeve 118 from the driven hub 119, there is provided a control shaft 129 on which there is secured a clutch stop and release lever 130 which is positioned to engage a stop shoulder 131 provided on a projecting portion of the casing 127. At the moment of engagement of the lever 130 with the stop shoulder 131, the shaft 116, to which the other end of the spring is connected, is rotating and it will continue to rotate and unwind the spring 120 until the shaft is stopped by a stop shoulder 132 on the flange 122 engaging a dog 133 on the shaft 129. When the spring 120 unwinds, it ceases to grip the hub 119 and sleeve 118 and thereby allows the die shaft 116 to remain stationary while the driving gear 121 continues to operate. The unwinding movement of the spring 120 may be little or great depending on the requirements.

In the specific form of the invention illustrated herein, it has been found that the relative movement between the ends of the springs in the order of 30° is sufficient.

After the stop shoulder 132 has engaged the dog 133, the inherent tendency of the spring is to rewind by causing reverse rotation on the shaft 116. To avoid this, the shaft 116 is provided with a disk 134 which has a stop shoulder 135 facing oppositely to the stop shoulder 132. A back-check pawl 136 pivoted on a stop shaft 137 is urged by a spring 138 in engagement with the surface of the disk 134 so that immediately after the dog 133 engages the shoulder 132 the back-check pawl 136 engages the shoulder 135 and thus the shaft 116 and the die 52 are positively held against movement in either direction.

In order to start the operation of the one revolution clutch 53 and cause the cancelling die 52 to operate, the shaft 116 is provided with an arm 139 adapted to be operated by the solenoid 54. The solenoid 54 has an armature 140 which has at one end a link 141 connected to the arm 139. The link 141 has its terminal end connected to a return spring 142. When the solenoid 54 is energized, it causes the stop pawls 130 and 133 to disengage the stop shoulders and thus permits the spring 120 to wind and grip the drums 118a and 119a, with the result that the cancelling die is rotated and the rotation continues until the stop shoulders 131 and 132 are engaged by the pawls 130 and 133, whereupon the shaft 116 is stopped.

To permit the use of a light return spring 142 for the armature 140 and the shaft 129, there is provided on the shaft 129 an arm 143 which is positioned to engage a cam 144 on the shaft 116 and this cam is so shaped and positioned as to operate the arm 143 and positively rotate the shaft 129 and cause the pawls 130 and 133 to be moved to the declutching position shown in FIG. 11.

To avoid an unrequired repeated operation of the cancelling die shaft 116 which might occur if the pawls 130 and 133 rebound away from the stop shoulders, the stop shoulder 132 may be provided with a slight undercut as shown in the order of 70° and the pawl will be shaped to fit the undercut so as to be trapped momentarily thereby in stop-engaging position.

The dies 52 are inked by a yielding ink roller 145 whose position may be regulated by an adjusting screw 146.

Segregating Mechanism

As was pointed out above, the segregating mechanism includes three stacking compartments 26, 27 and 28 and the deflecting vanes 30 and 31 which control the passage of successive letters into a predetermined one of the compartments.

As will be seen from FIG. 3A and FIG. 4A, the vanes are mounted on vertical shafts 147, each shaft having a pair of opposite arms 148 by which each vane may be moved from the position where it is parallel to the path of the letters to a position where it intersects the path, and thus the vanes control the movement of the letters in one of the three compartments. The operating arms 148 for the vane 30 are connected to the armatures of the solenoids 94L and 89L while the operating arms for the vanes 31 are connected to solenoids 89R and 94R and by operation of the solenoids the vanes may be positively moved to and from their parallel positions and letter-intersecting positions.

The operation of the vanes 30 and 31 will be clearly understood from a consideration of FIG. 9A, FIG. 9B and FIG. 9C.

In FIG. 9A the vanes 30 and 31 are in the positions they occupy when the approaching letter is to be guided into the reject or no-stamp compartment 28. In FIG. 9B the vanes are shown parallel to the letter path and in such position the letters will pass straight ahead into the stacking compartment 26 which collects the letters having the stamp at the lower leading edge. In FIG. 9C the vanes 30 and 31 are in the positions which they occupy when the approaching letter has its cancelled stamp on the lower trailing edge. The arrows applied to the solenoids indicate energization of the solenoids and not necessarily movement thereof.

Just before the signal is given to determine into which stacking compartments 26 or 27 an approaching letter is to pass, the circuits are controlled by the leading edge or trailing edge detector and timing circuits so that if no cancelling and segregating signal is received by the thyratron flip flops the solenoids 94L and 94R would be energized and the vanes 30 and 31 would be moved to the position shown in FIG. 9A, if they were not previously in such position. This is an important feature of the present invention because if there should be any faulty operation of the stamp scanning devices or the segregating circuits or if there is not sufficient contrast between the stamp and the body of the letter, the letter would be treated as though there were no cancelled stamp at the lower leading or trailing edges and it would pass to the reject or no-stamp compartment 28 and would not inadvertently pass to the compartment 26 or 27. From the compartment 28 the letter can be reprocessed and if it still rejects it can be treated separately as by hand-cancelling, etc.

If the cancelling and segregating signal is received, however, the vanes 30 and 31 do not actually move to the position shown in FIG. 9A because the stamp scanning signal arrives at the thyratron flip flops five tenths millisecond after the solenoids 94L and 94R are energized and this is before the solenoids have time to respond and operate.

*Letter Stacking Mechanism*

As shown in FIG. 3A, there are three compartments into one of which each advancing letter is directed by the segregating mechanism. The compartment 26, in the form of the invention shown herein, receives letters having cancelled stamps at their lower leading edges while the compartment 27 receives letters having cancelled stamps at their lower trailing edges and the compartment 28 receives letters having no cancelled stamps at their lower edges.

When a letter having a cancelled stamp at the lower leading edge approaches the vanes 30 and 31, the latter are parallel and the letter may therefore continue to travel in its original path during which it is guided by guide plates 153 to position between continuously rotating feed rollers 154 from which it is guided by guide plates 155 to another pair of continuously operating feed rollers 156 from which it passes into the compartment 26.

When a letter having a cancelled stamp at its lower trailing edge approaches the segregating mechanism, the vane 30 is moved to intersect the path of the letter and assume the position shown in FIG. 9C so that the letter is directed to the left and into the stacking compartment 27, the letter being guided by an inclined guide plate 157L.

When no cancelled stamp is present on the approaching letter, the vane 31 intersects the path of the letter and causes the letter to follow it and the guide plate 157R so that the letter enters the "no-stamp" or reject compartment 28.

In each of the compartments 26, 27 and 28 there is a leading edge stop 158, a fixed lateral guide 159 and a yielding lateral guide or presser plate 160. Also in each compartment there is a continuously rotating impeller 161 which assures the movement of the last letter to enter the compartment to position to engage the lead edge stop 158. As the letters accumulate between the lateral guides 159 and 160, the latter recedes in the well known manner so that the letters may accumulate in a stack. This operation is assisted by a continuously driven belt 162 which is positioned to engage the lower edges of the letters just above the plane of the paper table 23. After a quantity of letters has been accumulated the belt 162 urges the trailing edges of the letters away from a letter entering the compartment so as to keep a suitable throat open between the stack and the lateral guide 159.

As shown in FIG. 3A and FIG. 4A, one of each of the pairs of rollers 154 and 156 is mounted on a spring-pressed arm 163 so as to yieldingly engage the other roller of the pair and permit letters of various thicknesses to be fed between them.

While in order to comply with the statute the invention is described in language which is rather specific as to structural features and arrangements, it is to be understood that the invention is not limited to the specific details shown, but that the means and method herein disclosed comprises the preferred of several modes of putting the invention into effect, and the invention is therefore claimed in any of its forms or modifications within the scope of the language employed in the appended claims.

What is claimed is:

1. A letter segregating apparatus comprising: means for feeding letters in one-by-one succession along a path; a plurality of letter stackers; two letter-deflecting vanes located in side-by-side relation at opposite sides of said path; means mounting each of said vanes for movement between two positions; each of said vanes lying across said path when in a first one of said two positions and lying out of said path when in the second one of said two positions; each letter fed along said path being directed to the location of a first one of said letter stackers when one of said vanes is in said first position and the other vane is in said second position, being directed to the location of a second one of said letter stackers when said other vane is in said first position and said one vane is in said second position, and being directed to another location when both of said vanes are in said second position; a respective control means operatively associated with each of said vanes; each of said control means being arranged to dispose the vane associated therewith in one of said two positions when in a set condition, to dispose the vane associated therewith in the other one of said two positions when in a reset condition, and to assume said reset condition at a time when each fed letter approaches said vanes; and recognition and timing means operatively arranged for selectively setting each of said control means, depending upon the positions to be assumed by the two vanes for each fed letter, within a shorter time interval after said time than that required by each of said control means to effect movement of the vane associated therewith whereby neither of said vanes moves except when the respective vane is to change from one of said two positions for one fed letter to the other of said two positions for the next succeeding fed letter.

2. The letter segregating apparatus as set forth in claim 1 wherein said recognition and timing means is operatively arranged to produce, for each fed letter, a timing pulse beginning at said time and having a duration equal to said shorter time interval; and wherein each of said control means includes an electronic device operatively arranged to be reset by the lead edge of each of said timing pulses and to be selectively set by the trail edge of each of said timing pulses.

References Cited in the file of this patent

UNITED STATES PATENTS

| | | |
|---|---|---|
| 1,729,521 | Roddy | Sept. 24, 1929 |
| 1,992,686 | Anderson | Feb. 26, 1935 |
| 2,165,415 | Rindfloisch | July 11, 1939 |
| 2,224,646 | Friedman et al. | Dec. 10, 1940 |
| 2,358,051 | Broido | Sept. 12, 1944 |
| 2,563,274 | Rendel | Aug. 7, 1951 |
| 2,609,928 | Doust | Sept. 9, 1952 |
| 2,719,629 | Robinson | Oct. 4, 1955 |
| 2,753,464 | Stone | July 3, 1956 |
| 2,809,741 | Keilig | Oct. 15, 1957 |
| 2,936,886 | Harmon | May 17, 1960 |

FOREIGN PATENTS

| | | |
|---|---|---|
| 292,974 | Great Britain | Mar. 21, 1929 |
| 675,556 | Great Britain | July 16, 1952 |
| 682,303 | Great Britain | Nov. 5, 1952 |